United States Patent
Varhegyi et al.

(10) Patent No.: US 9,605,741 B2
(45) Date of Patent: Mar. 28, 2017

(54) DIFFERENTIAL SYSTEM FOR A MACHINE

(71) Applicant: Caterpillar Inc., Peoria, IL (US)

(72) Inventors: Aron Varhegyi, Oswego, IL (US);
Brian L. Bucciarelli, Minooka, IL (US)

(73) Assignee: Caterpillar Inc., Peoria, IL (US)

( * ) Notice: Subject to any disclaimer, the term of this patent is extended or adjusted under 35 U.S.C. 154(b) by 67 days.

(21) Appl. No.: 14/624,875

(22) Filed: Feb. 18, 2015

(65) Prior Publication Data

US 2016/0238119 A1 Aug. 18, 2016

(51) Int. Cl.
*F16H 48/40* (2012.01)
*F16H 48/20* (2012.01)
*F16H 48/22* (2006.01)
*F16H 48/08* (2006.01)

(52) U.S. Cl.
CPC .............. *F16H 48/40* (2013.01); *F16H 48/22* (2013.01); *F16H 2048/085* (2013.01); *F16H 2048/405* (2013.01)

(58) Field of Classification Search
CPC .......... F16H 48/06; F16H 48/08; F16H 48/22; F16H 48/40; F16H 2048/085; F16H 2048/405
See application file for complete search history.

(56) References Cited

U.S. PATENT DOCUMENTS

| | | | | |
|---|---|---|---|---|
| 3,605,965 A | * | 9/1971 | Thomas | F16D 25/0638 192/85.49 |
| 4,959,043 A | * | 9/1990 | Klotz | F16H 48/08 475/220 |
| 5,989,143 A | | 11/1999 | Bell et al. | |
| 6,027,423 A | | 2/2000 | Bell | |
| 6,146,304 A | | 11/2000 | Bendtsen | |
| 6,485,389 B1 | | 11/2002 | Bell et al. | |
| 2009/0013533 A1 | * | 1/2009 | Isken, II | F16H 48/08 29/893.1 |
| 2010/0317483 A1 | * | 12/2010 | Radzevich | F16H 55/0846 475/230 |
| 2015/0330494 A1 | * | 11/2015 | Kluck | F16H 57/082 475/230 |

FOREIGN PATENT DOCUMENTS

CN   203847656   9/2014

\* cited by examiner

*Primary Examiner* — Jacob S Scott

(74) *Attorney, Agent, or Firm* — Jeffrey A. Greene; Miller, Matthias & Hull

(57) ABSTRACT

A differential system for transmitting a driving power from an input shaft to a pair of output shafts includes a drive gear for receiving a rotational input from the input shaft and a driven gear driven by the drive gear. The driven gear defines multiple slots radially spaced about an axis of rotation of the driven gear. The differential system also includes a spider member having a central body portion with multiple legs partially received in the corresponding slots. The differential system includes at least one cover member coupled to the driven gear to retain the legs in the corresponding slots, a differential casing enclosing at least the driven gear and the spider member and a bearing disposed between the at least one cover member and the differential casing. The bearing supports a rotation of the cover member about the axis of rotation relative to the differential casing.

20 Claims, 3 Drawing Sheets

DIFFERENTIAL SYSTEM FOR A MACHINE

TECHNICAL FIELD

The present disclosure relates to a differential system for a machine, and more particularly to a compact differential system for the machine.

BACKGROUND

Typically, a differential system may be used in machines for driving wheels of the machine and also for permitting speed differentials between the wheels. The differential system may include a gear arrangement that allows torque to be transferred from a driveshaft to a pair of output shafts that are coupled to the wheels. Further, the differential systems may operate to allow the output shafts to rotate at different speeds or different torques as needed. A size and configuration of the differential system may be critical due to a position of the differential system within the machine.

U.S. Pat. No. 6,146,304 describes a differential apparatus for transmitting a driving force from a pinion gear supported on an input shaft to a pair of axle output shafts. The differential apparatus includes a differential case, a ring gear, and a spider gear assembly. The differential case is made from a single piece and includes a longitudinally extending central bore that defines a longitudinal axis. The differential case includes a plurality of longitudinal slots extending along an inner surface of the central bore. A ring gear is supported by the differential casing and is rotatable about the longitudinal axis by the pinion gear connected to the input shaft. The ring gear is preferably welded to the differential casing. The differential apparatus also includes a spider member that has a central body portion with a plurality of legs extending radially outwardly from the body portion. A spider gear is supported on each of the legs. The differential case can be used with either a standard differential or a limited slip differential. In the standard differential, the spider legs are received and retained within the longitudinal slots of the ring gear without the use of fasteners. In the limited slip differential, an actuator housing assembly includes tabs that are received in the longitudinal slots and the spider legs react against the actuator housing assembly. In both configurations, the spider gears drive side gears that are mounted to each of the axle shafts, which drive the vehicle's wheels.

SUMMARY OF THE DISCLOSURE

In one aspect of the present disclosure, a differential system for transmitting a driving power from an input shaft to a pair of output shafts is provided. The differential system includes a drive gear for receiving a rotational input from the input shaft. The differential system also includes a driven gear defining an axis of rotation and driven by the drive gear. The driven gear defines a central bore and a plurality of slots radially spaced about the axis of rotation and extending from the central bore. The differential system also includes a spider member having a central body portion with a plurality of legs extending radially outwardly therefrom. Each of the plurality of legs has an end portion partially received in one of the plurality of slots. The differential system also includes at least one cover member coupled to the driven gear to retain the legs in the corresponding plurality of slots, and a differential casing enclosing at least the driven gear and the spider member. The differential system further includes a bearing disposed between the at least one cover member and the differential casing. The bearing supports a rotation of the cover member about the axis of rotation relative to the differential casing.

In another aspect of the present disclosure, a power train for transmitting a driving power from a power source of a machine to a pair of ground engaging members of the machine is provided. The power train includes an input shaft for receiving the driving power from the power source and a pair of output shafts coupled to the pair of ground engaging members. The power train further includes a differential system for transmitting the driving power from the input shaft to the pair of output shafts. The differential system includes a drive gear for receiving a rotational input from the input shaft. The differential system also includes a driven gear defining an axis of rotation and driven by the drive gear. The driven gear defines a central bore and a plurality of slots radially spaced about the axis of rotation and extending from the central bore. The differential system also includes a spider member having a central body portion with a plurality of legs extending radially outwardly therefrom. Each of the plurality of legs has an end portion partially received in one of the plurality of slots. The differential system also includes at least one cover member coupled to the driven gear to retain the legs in the corresponding plurality of slots, and a differential casing enclosing at least the driven gear and the spider member. The differential system further includes a bearing disposed between the at least one cover member and the differential casing. The bearing supports a rotation of the cover member about the axis of rotation relative to the differential casing.

Other features and aspects of this disclosure will be apparent from the following description and the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
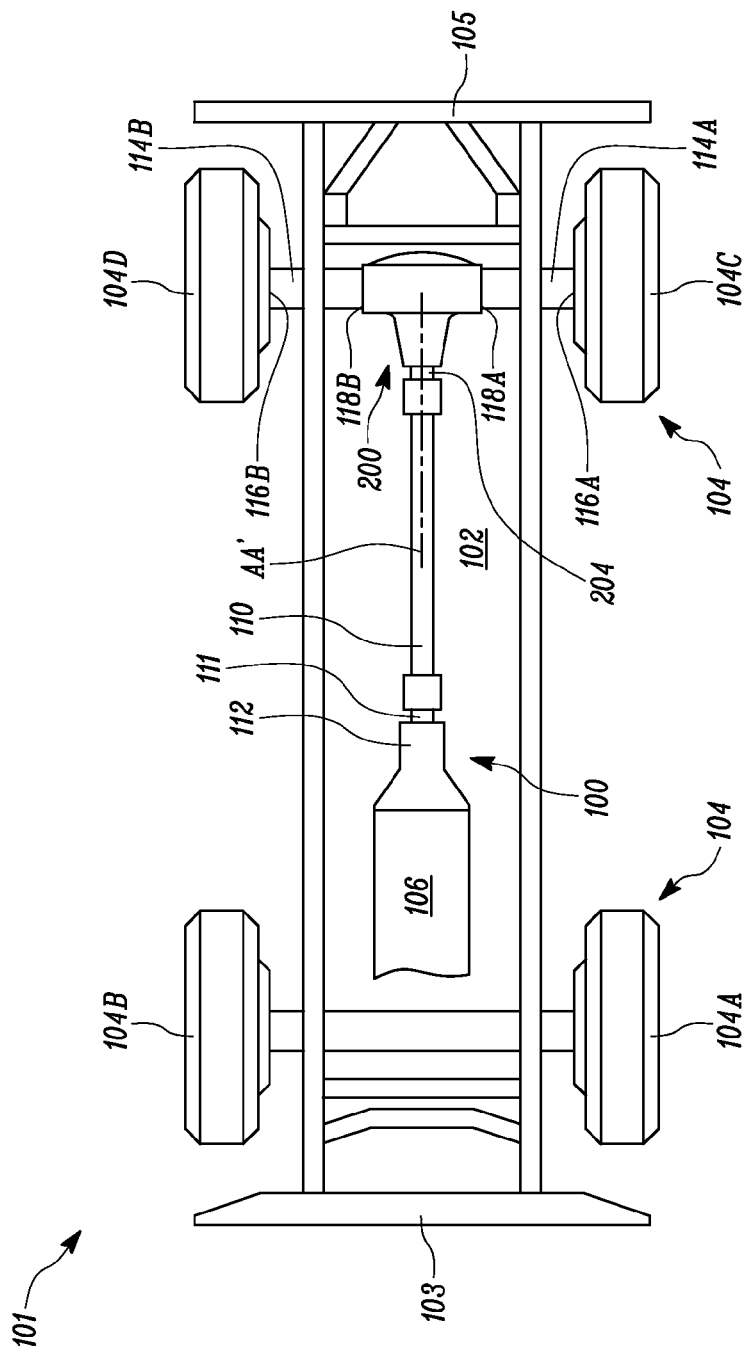
FIG. 1 is a schematic view showing a power train of a machine, according to an embodiment of the present disclosure.

Referring to FIG. 1, a schematic view of a power train 100 of an exemplary machine 101 is illustrated. The machine 101 may be embodied in the form of a backhoe loader, an excavator, a dozer, a wheel loader, a motor grader, an off-highway vehicle, an on-highway vehicle or other machines typically employed in applications, such as mining, forestry, waste management, construction, agriculture, transportation and the like. The present disclosure is generally relevant to any machine having the power train 100, as will become evident from the following description.

The machine 101 includes a frame 102 and a set of ground engaging members 104 supported thereon. The frame 102 may also support the power train 100 thereon. The set of ground engaging members 104 may be configured to provide mobility to the machine 101. In the embodiment of FIG.

1, the set of ground engaging members 104 are wheels. Further, the set of ground engaging members 104 may include a pair of front ground engaging members 104A, 104B disposed proximate to a front side 103 of the machine 101. The set of ground engaging members 104 may also include a pair of rear ground engaging members 104C, 104D disposed proximate to a rear side 105 of the machine 101. Alternatively, the set of ground engaging members 104 may include tracks. Although, the pair of front ground engaging members 104A, 104B and the pair of rear ground engaging members 104C, 104D are illustrated, it may be recognized that the machine 101 may include any number of ground engaging members 104.

The machine 101 includes a power source 106 that may be configured to supply a driving power to various components including, but not limited to, the front and/or the rear set of ground engaging members 104A, 104B and 104C, 104D. The power source 106 may include an internal combustion engine. For example, the power source 106 may be one of a diesel engine, a gasoline engine, a gaseous fuel-powered engine, or any other engine known in the art. It is also contemplated that the power source 106 may alternatively include a non-combustion source such as, for example, a battery, a fuel cell, or any other known non-combustion source of power.

The power train 100 is configured to transmit the driving power from the power source 106 to at least one of the pair of front ground engaging members 104A, 104B and the pair of rear ground engaging members 104C, 104D. In the illustrated embodiment, the power train 100 is configured to transmit the driving power to the pair of rear ground engaging members 104C, 104D.

The power train 100 includes an input shaft 110 defining an axis AA'. The input shaft 110 may be configured to receive the driving power from the power source 106 via a transmission system 112. The transmission system 112 may be operatively coupled between the power source 106 and a first end 111 of the input shaft 110. The transmission system 112 may include various components such as, for example, multiples gears to transmit the driving power from the power source 106 to the input shaft 110 at various speed-to-torque ratios. The input shaft 110 may rotate about the axis AA' upon receiving the driving power through the transmission system 112. In various examples, the transmission system 112 may include a power-shift transmission, a continuously variable transmission, a hybrid transmission, or any other types of transmission systems known in the art.

The power train 100 may further include output shafts associated with the set of ground engaging members 104. As shown in FIG. 1, a pair of output shafts 114A, 114B may be associated with the rear ground engaging members 104C, 104D respectively. Each of the output shafts 114A, 114B may include first ends 116A, 116B and second ends 118A, 118B. The first ends 114A, 114B of the output shafts 114A, 114B may be coupled to the rear ground engaging members 104C, 104D respectively for rotation therewith.

The power train 100 also includes a differential system 200 disposed adjacent to a second end 204 of the input shaft 110. In general, the differential system 200 may be configured to receive a driving power from the input shaft 110 and provide a rotational output to a pair of output shafts to drive the corresponding ground engaging members 104. In the illustrated embodiment, the differential system 200 is configured to provide a rotational output to the pair of output shafts 114A, 114B associated with the pair of rear ground engaging members 104C, 104D. The differential system 200 may allow the ground engaging members 104C, 104D to rotate at different speeds and/or different torques relative to one another as needed. As shown, the differential system 200 may be disposed between the second ends 118A, 118B of the output shafts 114A, 114B respectively.

The differential system 200 will be explained hereinafter in conjunction with the power train 100 of FIG. 1. However, one of ordinary skill in the art will appreciate that the differential system 200 may be configured for implementation in power trains of various other configurations known in the art. For example, the differential system 200 may be configured to transmit the driving power to the pair of front ground engaging members 104A, 104B, the pair of rear ground engaging members 104C, 104D, a combination thereof, or others as desired.

Figure 2:
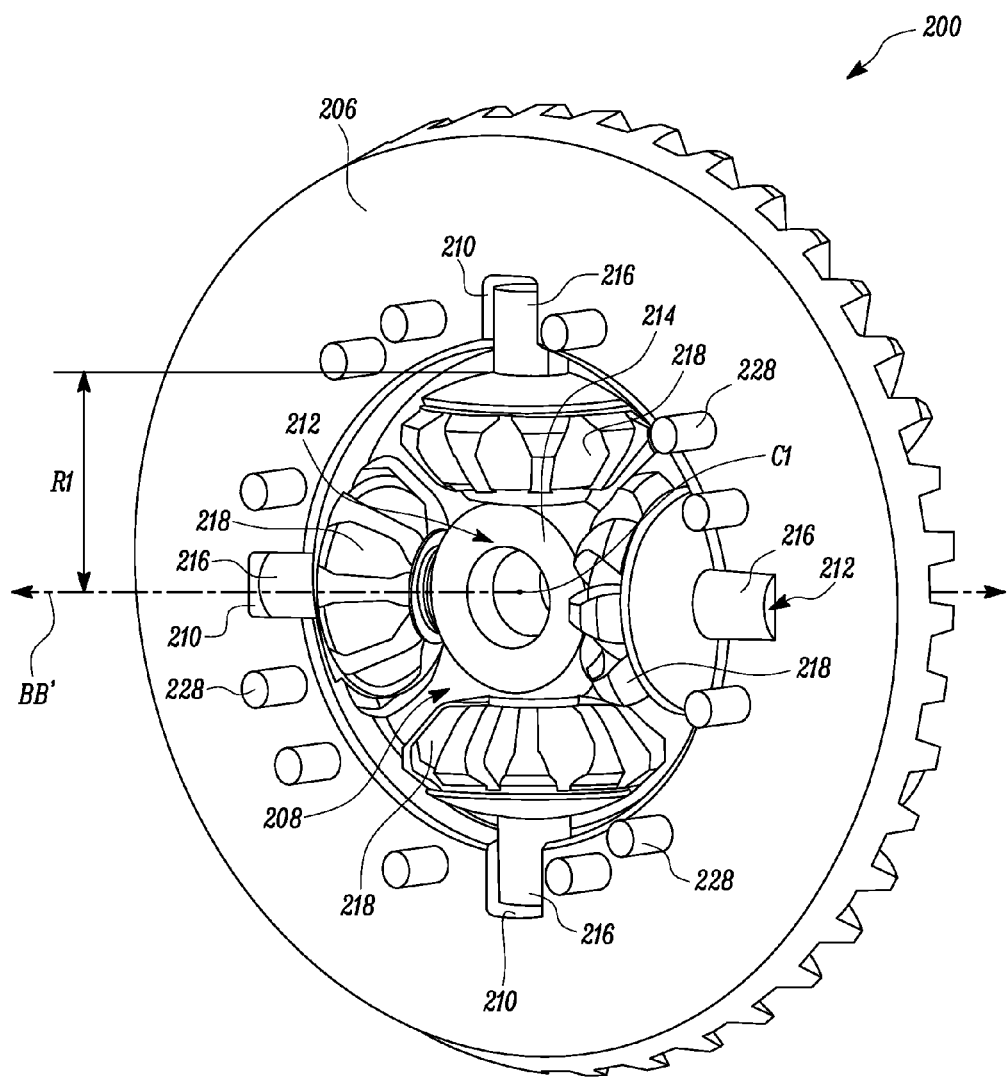
FIG. 2 is a perspective view of a driven gear and a spider member of a differential system of the power train, according to an embodiment of the present disclosure.
Figure 3:
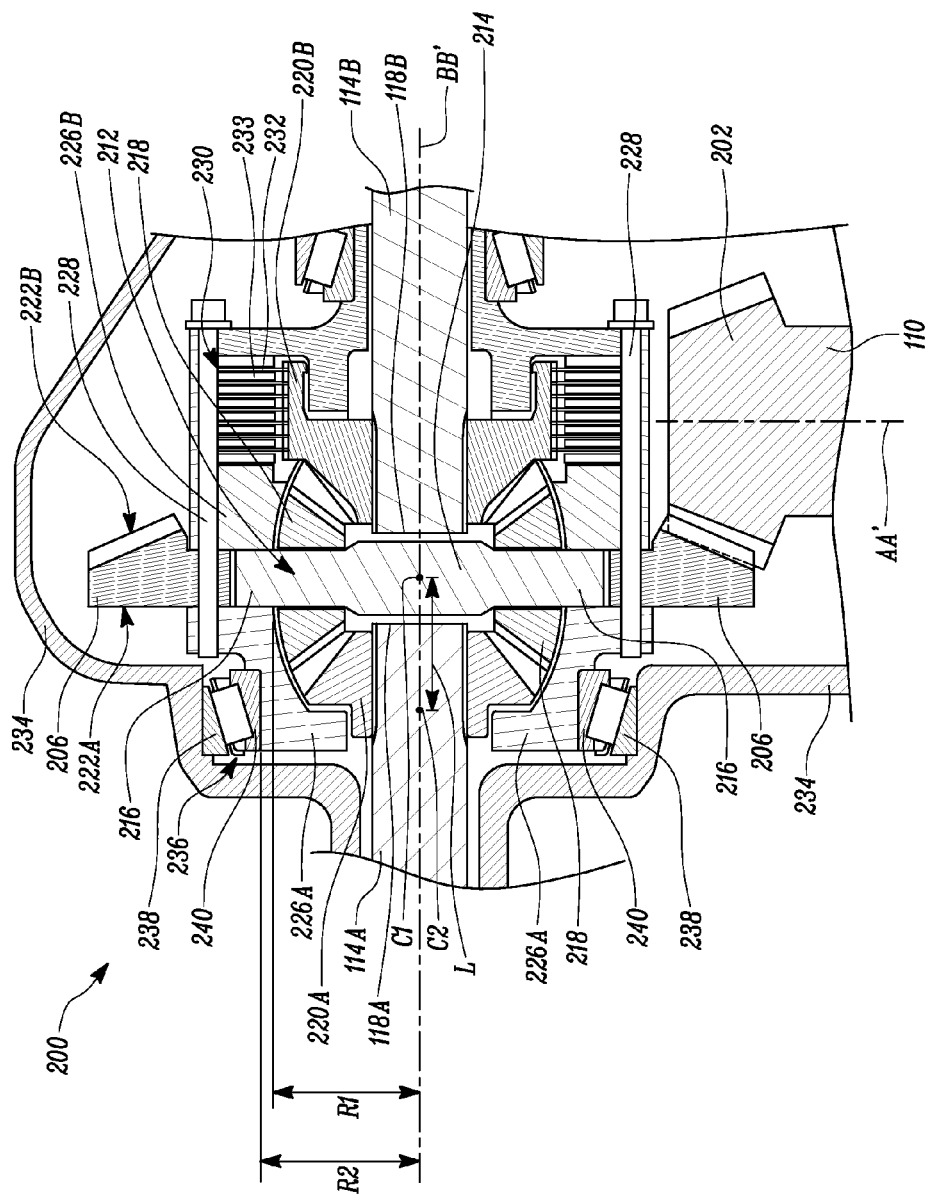
FIG. 3 is a sectional view of the differential system, according to an embodiment of the present disclosure.

Referring to FIGS. 2 and 3, the differential system 200 includes a drive gear 202 for receiving a rotational input from the input shaft 110. The drive gear 202 may be fixedly coupled to the input shaft 110 at the second end 204 thereof. Further, the input shaft 110, as described above may receive the driving power from the power source 106 through the transmission system 112. In the illustrated embodiment, the drive gear 202 is a bevel gear.

The differential system 200 also includes a driven gear 206 that is configured to engage with the drive gear 202. In the illustrated embodiment, the driven gear 206 is a ring gear. The driven gear 206 defines a center C1 and an axis of rotation BB' about the center C1. The driven gear 206 may be disposed in mesh with the drive gear 202 such that the axis AA' of the input shaft 110 and the axis of rotation BB' of the driven gear 206 may become perpendicular to each other. Further, the drive gear 202 may transmit the rotatory power to the driven gear 206 causing the driven gear 206 to rotate about the axis of rotation BB'.

The driven gear 206 defines a central bore 208 (shown in FIG. 2) about the axis of rotation BB'. The central bore 208 may have a radius R1. The driven gear 206 further defines multiple slots 210 that may be radially spaced about the axis of rotation BB' and extending from the central bore 208. In the illustrated embodiment, the slots 210 may extend in directions perpendicular to the axis of rotation BB'.

The differential system 200 further includes a spider member 212. The spider member 212 includes a central body portion 214 having a plurality of legs 216 extending radially therefrom. In an embodiment, each of the legs 216 may be disposed at an equal distance with respect to an adjacent leg 216.

Further, each of the legs 216 of the spider member 212 rotatably supports a spider gear 218. In an embodiment, a transition fit may be provided between the spider gear 218 and the corresponding legs 216. In an example, the spider gears 218 may be bevel gears. In the illustrated embodiment, the spider member 212 includes four legs 216. Each of the legs 216 includes the spider gear 218 rotatably supported thereon. However, it may be contemplated that the spider member 212 may include any number of legs 216 arranged in different configurations relative to the central body portion 214.

Referring to FIG. 2, the spider member may be disposed proximate to the central bore 208. Specifically, each of the legs 216 may have an end portion that is configured to be partially received in the corresponding slot 210 defined in the driven gear 206. Accordingly, the slots 210 defined in the driven gear 206 are spaced at an equal distance from each other so as to accommodate the corresponding legs 216. Moreover, a design configuration and a number of slots 210 defined in the driven gear 206 may vary in accordance with the configuration and a number of the legs 216 of the spider member 212.

Further, each of the spider gears 218 that are supported on the legs 216 may be received within the central bore 208. Moreover, each of the spider gears 218 may extend towards both a first side 222A of the driven gear 206 and a second side 222B of the driven gear 206. With such an arrangement, the spider member 212 may rotate along with the driven gear 206 about the axis of rotation BB' as the driving power is transmitted from the input shaft 110 to the driven gear 206.

Referring to FIG. 3, the differential system 200 may also include side gears 220A, 220B configured to receive a rotational input from the driven gear 206. The side gear 220A may be disposed on the first side 222A of the driven gear 206 and the side gear 220B may be disposed on the second side 222B of the driven gear 206. Moreover, the side gears 220A and 220B may be configured to be in mesh with each of the spider gears 218.

Further, the side gears 220A, 220B are also coupled to the output shafts 114A, 114B adjacent to the second ends 118A, 118B respectively. As such, the side gears 220A, 220B may rotate along with the corresponding output shafts 114A, 114B. In an example, the side gears 220A, 220B may include splines (not shown) disposed on an inner surface thereof. The splines of the side gears 220A, 220B may be coupled to corresponding splines formed on an outer surface of the output shafts 114A, 114B adjacent to the second ends 118A, 118B.

The differential system 200 also includes at least one cover member configured to retain the legs 216 in the corresponding slots 210. The cover members may be coupled to the driven gear 206. In the illustrated embodiment, the differential system 200 includes two cover members namely, a first cover member 226A and a second cover member 226B. In another embodiment, the differential system 200 may include a single cover member. Alternatively, the differential system 200 may include multiple cover members, at least one of the cover member configured to retain the legs 216 in the corresponding slots 210.

The first cover member 226A may be disposed adjacent to the first side 222A of the driven gear 206. Further, the first cover member 226A may be configured to at least partially enclose the first side 222A of the driven gear 206. The second cover member 226B may be disposed adjacent to the second side 222B of the driven gear 206. Further, the second cover member 226B may be configured to at least partially enclose the second side 222B of the driven gear 206.

The first and second cover members 226A, 226B may be coupled to the driven gear 206. As such, the first and second cover members 226A, 226B may rotate along with the driven gear 206. In the illustrated embodiment, each of the first and second cover members 226A, 226B may be coupled to the driven gear 206 with a plurality of fasteners 228. In an example, the fastener 228 may be a stud. However, it may be contemplated to use other coupling methods known in the art to couple each of the first and second cover members 226A, 226B to the driven gear 206.

In an embodiment, the differential system 200 may operate so that a substantially equal amount of torque is transmitted to each of the pair of output shafts 114A, 114B. As such, the output shafts 114A, 114B may rotate at different speeds relative to each other. Additionally or optionally, the differential system 200 may include a locking arrangement such as a clutch assembly 230 that may be configured to allow each of the output shafts 114A, 114B to rotate at a substantially equal speed.

The clutch assembly 230 may be coupled with the at least one cover member 226A, 226B and one of the side gears 220A, 220B. Further, the clutch assembly 230 is configured to move between a locked position and an unlocked position. In the locked position, the clutch assembly 230 rotationally locks the side gears 220A or 220B with the corresponding cover member 226A or 226B. As such, the side gears 220A and 220B on both the first and the second sides 222A, 222B of the driven gear 206 may rotate at a substantially same speed. In the unlocked position, the differential system 200 may allow a speed differential between each of the output shafts 114A, 114B.

In the illustrated embodiment, the clutch assembly 230 is coupled to the second cover member 226B and the side gear 220B. In an example, the clutch assembly 230 may include one or more friction discs 232 that are coupled to the side gear 220B. The friction discs 232 may be splined to the side gear 220B. The clutch assembly 230 may further include a set of separator plates 233 disposed in between adjacent pairs of the friction discs 232. As shown in FIG. 2, the set of separator plates 233 may also be disposed adjacent to the second cover member 226B. Further, the clutch assembly 230 may be coupled to the second cover member 226B with the plurality of fasteners 228.

The clutch assembly 230 may also include an actuator (not shown) such as a hydraulic actuator configured to displace the clutch assembly 230. Specifically, the actuator may displace the set of separator plates 233 relative to the second cover member 226B. In the locked position, the actuator may operate to displace the clutch assembly 230 towards the second cover member 226B by forcing the separator plates 233 against the adjacent friction discs 232. As such, the clutch assembly 230 may engage with the second cover member 226B. Moreover, the side gear 220B that is in engagement with the friction discs 232 may be rotationally locked with the second cover member 226B in the locked position. With such a configuration, each of the side gears 220A, 220B may receive a substantially same rotational input from the driven gear 206 thereby rotating the corresponding output shafts 114A, 114B at a substantially same speed.

A person of ordinary skill in the art will recognize that the clutch assembly 230 described herein in exemplary in nature and hence non-limiting of this disclosure. Moreover, different types of clutch assemblies known in the art may be implemented in the differential system 200. Further, it may also be additionally contemplated to configure the differential system 200 without the use of the clutch assembly 230.

The differential system 200 also includes a differential casing 234 configured to enclose at least the driven gear 206 and the spider member 212. In an embodiment, the differential casing 234 may be formed as a unitary construction. In another embodiment, the differential casing 234 may include multiple segments that may be suitably coupled to form the differential casing 234. For example, the differential casing 234 include two segments, each of the segments enclosing the driven gear 206 and the spider member 212 from the first and second sides 222A, 222B.

The differential system 200 further includes one or more bearings 236 disposed between at least one of the cover members 226A, 226B and the differential casing 234. The bearing 236 is configured to rotatably support the cover members 226A, 226B relative to the differential casing 234. In the illustrated embodiment, the bearing 236 is disposed on the first cover member 226A.

As shown in FIG. 2, the bearing 236 may include an outer bearing race 238 and an inner bearing race 240. The outer bearing race 238 may be configured to engage the differential casing 234 and the inner bearing race 240 may be configured to engage with the first cover member 226A. Further, the bearing 236 may be disposed on the first cover member 226A such that each of the spider gears 218 is radially inward with respect to the bearing 236 along the axis of rotation BB'. Such a configuration may be accomplished by using the bearing 236 of an inner radius R2 greater than the radius R1 of the central hole 208. As such, each of the spider gears 218 is nested within a projected space defined by an inner circumference of the bearing 236 along the axis of rotation BB'. Moreover, each of the side gears 220A, 220B may also be nested within the projected space. The differential system 200 may define an axial length L measured along the axis of rotation BB' between the center C1 of the driven gear 206 and a center C2 of the bearing 236.

In an embodiment, the bearing 236 may be a tapered roller bearing. In another embodiment, the bearing 236 may be a ball bearing. In various embodiments, other bearings known in the art may be used. Additionally or optionally, the bearing 236 may be disposed between the second cover member 226B and the differential casing 234.

Various additional components and features associated with the differential system 200 such as, retention rings, spacers and the like have been omitted in the illustrations for the sake of simplicity and aiding clarity in understanding of the present disclosure. Therefore, such omission of the additional components and/or features must not be construed as being limiting of this present disclosure, rather the differential system 200 may be implemented with such additional components and/or features depending on specific requirements of an application.

INDUSTRIAL APPLICABILITY

The present disclosure relates to the differential system 200 for a machine 101. More specifically, the present disclosure relates to an axially compact differential system 200. The differential system 200 includes the driven gear 206 that is driven by the drive gear 202. The differential system 200 also includes the spider member 212 disposed in the central bore 208 defined by the driven gear 206. Further, the spider member 212 may include the plurality of legs 216 that are received in the corresponding slots 210 defined in the driven gear 206. Further one or more of the cover members 226A, 226B may be coupled to the driven gear 206.

The differential system 200 may further include the differential casing 234 that encloses the driven gear 206 and the spider member 212. Moreover, the differential casing 234 may form an outer cover for the differential system 200. Further, the bearing 236 may be provided to rotatably support various components of the differential system 200 such as, the cover members 226A, 226B and the driven gear 206 within the differential casing 234. In the differential system 200 of the present disclosure, the bearing 236 may be disposed between at least one of the cover members 226A, 226B and the differential casing 234. As such, the bearing 236 may be packed inside the differential casing 234. Moreover, many of the components of the differential system 200 such as, the spider gears 218, the side gears 220A, 220B may be nested within the projected space defined by the inner circumference of the bearing 236 along the axis of rotation BB'.

Such an arrangement of the bearing 236 between the first cover member 226A and the differential casing 234 may reduce the axial length L i.e., a distance between the center C1 of the driven gear 206 and the center C2 of the bearing 236. Moreover, a size and/or weight of the differential casing 234 that is used to enclose the differential system 200 of such reduced axial footprint may also be reduced. Therefore, an overall volume, weight, and production cost for the differential system 200 of the present disclosure may be minimized Additionally, such an axially compact differential system 200 may enable relatively relaxed sizes and positions for other components of the power train 100.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A differential system for transmitting a driving power from an input shaft to a pair of output shafts, the differential system comprising:
   a drive gear for receiving a rotational input from the input shaft;
   a driven gear defining an axis of rotation and driven by the drive gear, the driven gear defining a central bore and a plurality of slots radially spaced about the axis of rotation and extending from the central bore;
   a spider member having a central body portion with a plurality of legs extending radially therefrom, each of the plurality of legs having an end portion partially received in one of the plurality of slots;
   a spider gear supported on each of the plurality of legs of the spider member;
   at least one cover member coupled to the driven gear to retain the legs in the corresponding plurality of slots;
   a differential casing enclosing at least the driven gear and the spider member;
   a bearing disposed between the at least one cover member and the differential casing, the bearing supporting a rotation of the cover member about the axis of rotation relative to the differential casing, an inner circumference of the bearing defining a projected space relative to the axis of rotation; and
   a side gear connected with each of the pair of output shafts, the side gear configured to be in mesh with each of the spider gears and nested within the projected space of the bearing inner circumference.

2. The differential system of claim 1, wherein the bearing comprises:
   an outer bearing race coupled to the differential casing; and
   an inner bearing race coupled to the at least one cover member to support the rotation of the cover member relative to the differential casing.

3. The differential system of claim 1 further comprising a plurality of fasteners configured to couple the driven gear with the at least one cover member.

4. The differential system of claim 1, wherein the at least one cover member is a first cover member coupled to first side of the driven gear and a second cover member coupled to a second side of the driven gear that is opposite to the first side, the first and second cover members configured to retain the legs in the corresponding plurality of slots.

5. The differential system of claim 1, wherein the bearing is disposed on the at least one cover member such that each of the spider gears is radially inward with respect to the bearing along the axis of the rotation.

6. The differential system of claim 1, wherein the spider gears are bevel gears.

7. The differential system of claim 1 further comprising a clutch assembly coupled with the at least one cover member and one of the side gears, the clutch assembly movable between a locked position and an unlocked position, wherein the clutch assembly is configured to rotationally lock the one of the side gears with the at least one cover member in the locked position.

8. The differential system of claim 1, wherein the drive gear is a bevel gear and the driven gear is a ring gear.

9. The differential system of claim 1, wherein the central bore has a central bore radius R1, and the inner circumference of the bearing has a bearing inner radius R2 that is greater than the central bore radius R1.

10. The differential system of claim 9, in which each spider gear is disposed in the central bore and nested within the projected space of the bearing inner circumference.

11. A power train for transmitting a driving power from a power source of a machine to a pair of ground engaging members of the machine, the power train comprising:
   an input shaft for receiving the driving power from the power source;
   a pair of output shafts coupled to the pair of ground engaging members; and
   a differential system for transmitting the driving power from the input shaft to the pair of output shafts, the differential system comprising:
      a drive gear for receiving a rotational input from the input shaft;
      a driven gear defining an axis of rotation and driven by the drive gear, the driven gear defining a central bore and a plurality of slots radially spaced about the axis of rotation and extending from the central bore;
      a spider member having a central body portion with a plurality of legs extending radially therefrom, each of the plurality of legs having an end portion partially received in one of the plurality of slots;
      a spider gear supported on each of the plurality of legs of the spider member;
      at least one cover member coupled to the driven gear to retain the legs in the corresponding plurality of slots;
      a differential casing enclosing at least the driven gear and the spider member; and
      a bearing disposed between the at least one cover member and the differential casing, the bearing supporting a rotation of the cover member about the axis of rotation relative to the differential casing, an inner circumference of the bearing defining a projected space relative to the axis of rotation; and
      a side gear connected with each of the pair of output shafts, the side gear configured to be in mesh with each of the spider gears and nested within the projected space of the bearing inner circumference.

12. The power train of claim 11, wherein the bearing comprises:
   an outer bearing race coupled to the differential casing; and
   an inner bearing race coupled to the at least one cover member to support the rotation of the cover member relative to the differential casing.

13. The power train of claim 11 further comprising a plurality of fasteners configured to couple the driven gear with the at least one cover member.

14. The power train of claim 11, wherein the at least one cover member is a first cover member coupled to a first side of the driven gear, and a second cover member coupled to a second side of the driven gear opposite to the first side, the first and second cover members configured to retain the legs in the corresponding plurality of slots.

15. The power train of claim 11, wherein the bearing is disposed on the at least one cover member such that each of the spider gears is radially inward with respect to the bearing along the axis of rotation.

16. The power train of claim 11, wherein the spider gears are bevel gears.

17. The power train of claim 11 further comprising a clutch assembly coupled with the at least one cover member and one of the side gears, the clutch assembly movable between a locked position and an unlocked position, wherein the clutch assembly is configured to rotationally lock one of the side gears with the at least one cover member in the locked position.

18. The power train of claim 11, wherein the drive gear is a bevel gear and the driven gear is a ring gear.

19. The power train of claim 11, wherein the central bore has a central bore radius R1, and the inner circumference of the bearing has a bearing inner radius R2 that is greater than the central bore radius R1.

20. The power train of claim 19, in which each spider gear is disposed in the central bore and nested within the projected space of the bearing inner circumference.

* * * * *